Nov. 26, 1968 A. W. CORNELL 3,413,417
AUXILIARY EARPHONE CIRCUIT FOR A HIGH VOLTAGE TRANSISTOR AMPLIFIER
Filed March 30, 1965
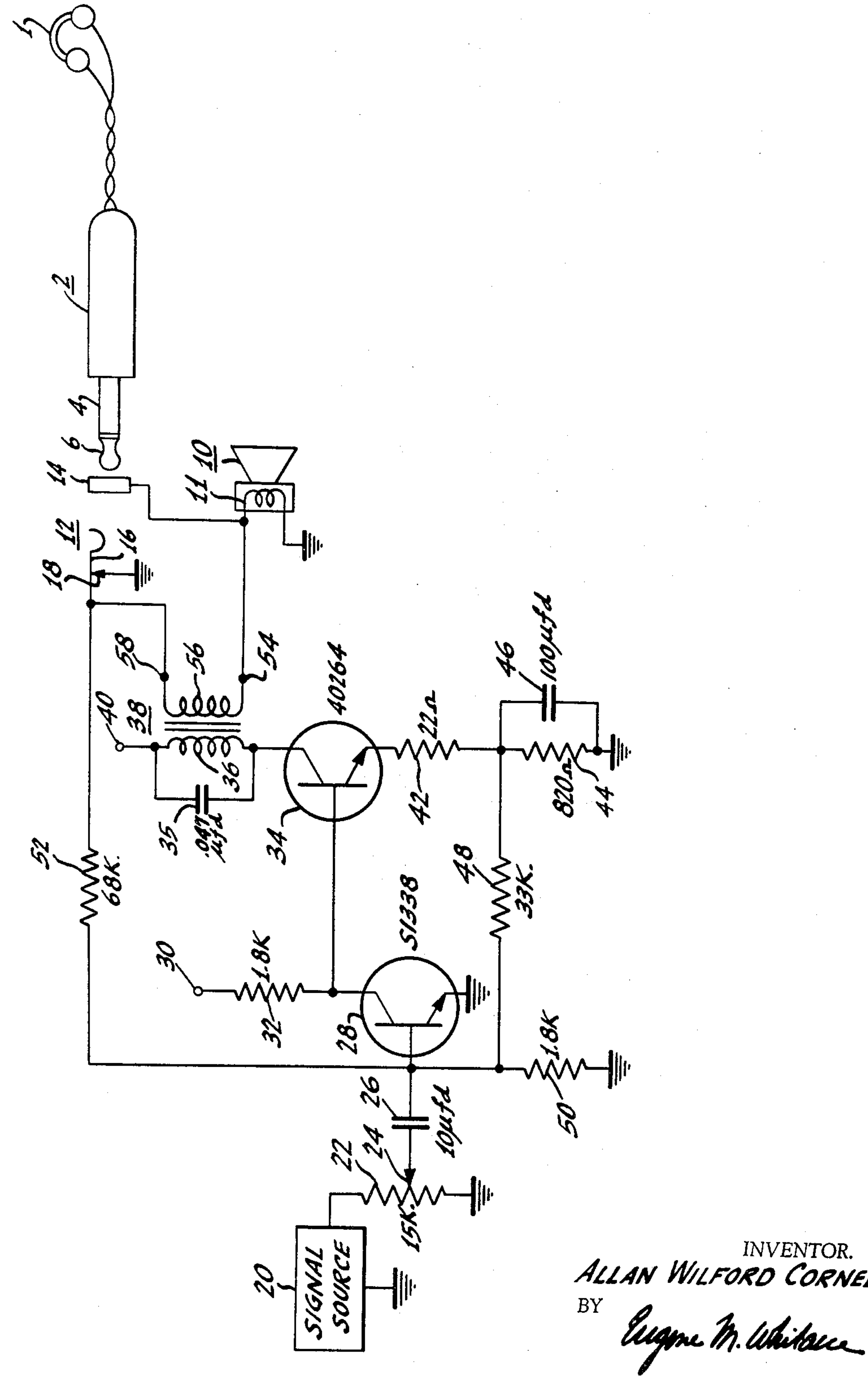
INVENTOR.
ALLAN WILFORD CORNELL
BY Eugene M. Whitacre
Attorney United States Patent Office 3,413,417

Patented Nov. 26, 1968

3,413,417

AUXILIARY EARPHONE CIRCUIT FOR A HIGH VOLTAGE TRANSISTOR AMPLIFIER

Allan W. Cornell, Midland, Mich., assignor to Radio Corporation of America, a corporation of Delaware Filed Mar. 30, 1965, Ser. No. 443,799
8 Claims. (Cl. 179—1)

ABSTRACT OF THE DISCLOSURE

Degenerative feedback is made operative by the insertion of the earphone jack to reduce the gain of the amplifier.

This invention relates to amplifying systems for driving different load elements having differing impedance values and/or dissipation characteristics. More particularly, the invention relates to amplifier circuits for radio and television receivers and the like which are adapted to selectively drive a self-contained loudspeaker means or an earphone device adapted to be plugged into a suitable receptacle connected with the amplifier circuit.

In various types of amplifying systems such as radios, television sets, or phonograph record players, etc., it is desirable to have an auxiliary output circuit for connecting thereto auxiliary sound reproducing devices such as earphones or pillow speakers in addition to the standard loudspeaker output circuit. These auxiliary output devices generally have a much lower dissipation capability or rating than the self-contained loudspeaker and require substantially less power to operate. As a result, such amplifying systems must be readily adaptable to drive both the high and low power devices without additional adjustments and preferably with a single compatible type of volume control means for all loads. In addition, it is generally desired to inactivate the speaker when the auxiliary output circuit is being used.

In the prior art, the self-contained loudspeaker was generally disconnected and the auxiliary output device was directly substituted into the circuit, or the loudspeaker was disconnected and the auxiliary output circuit was coupled to a lower power stage such as a driver stage. In such cases, the power supply voltage used to energize these circuits is generally low as compared to the breakdown voltage of the amplifying device, wherein the difference in the impedance presented by the auxiliary device and that of the loudspeaker did not subject the circuit to possible breakdowns. Furthermore, in order to achieve the required output power with the low power supply voltage, push-pull circuits were generally employed. With the push-pull circuits, transformer coupling is usually employed between the driver stage and the output stage which allows the auxiliary output device to be switched into the lower power driver stage without unbalancing the output stage biasing or producing serious transients into the circuit.

With the advent of commercially available high voltage transistors it is convenient to use a single-ended amplifier circuit rather than a push-pull circuit and achieve the required amount of power output by operating at high voltages. In such cases, the high impedance of an earphone as compared to a loudspeaker, is reflected back through the output transformer to the output transistor and subjects the output transistor to possible breakdown due to high voltage transients. On the other hand, if the impedance of the earphone approaches or is equal to that of the voice coil of the internal loudspeaker, the power that can be developed across each device by the amplifier circuit is essentially equal. Since the power dissipating capacity of the earphone etc., is generally much less than that of the loudspeaker, some sort of power limiter, such as a resistor, must be placed in series with the device. In either case whether the earphone impedance is high, or a series dropping resistor is used, the effective impedance of the auxiliary earphone circuit is greater than that of the loudspeaker. As a result, if the auxiliary device is to be directly substituted for the loudspeaker, the magnitude of the power supply voltage that can be safely used to energize the transistor circuit must be reduced, thereby reducing the output capabilites of the stage by a corresponding amount.

Furthermore, with single-ended amplifiers it is desirable to use direct coupling between the driver and the output stage to reduce cost while maintaining a desired frequency response characteristic. In a direct coupled circuit, the connection of an auxiliary device to the driver circuit requires switching in the base biasing circuit for the output transistor (to connect the earphone) and also switching in the output circuit (to render the loudspeaker inoperative). Such a switching arrangement is more expensive by requiring two separate switches and additional components (such as capacitors and resistors) to make the required connections.

In addition, if the earphones are directly substituted for the loudspeaker, some protection should be afforded against open circuits in the auxiliary device such as often experienced with earphones through continual use, etc. Such open circuits will reflect an undesirable high impedance into the high voltage transistor output amplifier circuit subjecting the transistor to possible destruction.

It is therefore an object of this invention to provide improved amplifying system capable of driving loads having either high or low power dissipating capabilities.

It is still a further object of this invention to provide an improved amplifier system including a switching means for adapting the amplifier for driving high and low power loads and having a compatible control means for both loads.

It is still a further object of this invention to provide an improved amplifying system for driving either a high power load or a low power auxiliary load that protects the output stage of the amplifier against breakdown in the amplifier circuit due to the differences in impedance levels between the two loads or due to open circuits in the auxiliary output load.

The amplifying system embodying the invention provides a means for connecting an amplifier circuit including a high voltage output transistor for selectively driving first and second output load impedances having different power dissipating capacities. The first load impedance, which may comprise a self-contained loudspeaker is connected to the amplifier output circuit through a switch. The second load impedance, which may comprise an earphone device is connected to the amplifier output when the switch is actuated. By way of example, the switch may be actuated when a suitable plug, connected to the second load, is inserted into a receptacle therefore. Upon the actuation of the switch a normally inoperative degenerative feedback circuit is connected between the amplifier input and output circuits to reduce the gain of the amplifier circuit. With the gain of the amplifier circuit reduced, the second load impedance having a lower power dissipating capacity may be driven without exceeding its power rating. Furthermore, with the gain reduced the second load having a higher impedance can be driven without developing high voltage transients which may cause catastrophic failure of the output transistor.

The novel features which are characteristic of this invention are set forth with particularity in the appended claims. The invention itself, however, both as to its organization and method of operation, as well as additional objects and advantages thereof, will be understood from the following description when read in connection with the accompanying drawing which is a schematic circuit diagram of an amplifying system embodying the invention.

While the amplifying system of the invention is generally applicable to various systems where it is required to drive a different output load impedance elements having different power dissipating capacity, it will be described with specific reference to an audio amplifier since such use is probably the most common environment for the use of the invention. For purposes of illustration, the amplifying system shown in the drawings includes a two-stage single-ended transistor audio amplifier including a high voltage output stage.

In the audio amplifier circuit of the drawing, the high power load is a loudspeaker 10, which, by way of example, may require a power amplifier capable of producing at least one-half watt of power. An auxiliary output jack 12, illustrated as an earphone jack, is provided for driving an external auxiliary sound reproducing device to be used with the system. The auxiliary sound reproducing device is illustrated, by way of example, as a set of earphones 1 or a pillow speaker connected to a standard type of earphone plug 2, adapted to be inserted to the output jack 12. The set of earphones 1 (or pillow speaker) generally require considerably less power to operate and have a much lower power dissipation capability than the loudspeaker 10.

The auxiliary output jack or earphone jack 12 is a standard type having a cylindrical collar contact 14, a resilient contact 16, and a switch contactor 18 which normally engages the resilient contact 16. As the plug 2 is inserted into the earphone jack 12, electrical contact is made to the plug shaft contact 4 through the collar contact 14 and to the plug tip contact 6 through the resilient contact 16 to power the set of earphones connected thereto, while the electrical connection between the switch contactor 18 and the resilient contact 16 is opened.

A block 20 in the drawing represents the audio signal source capable of producing signals of limited amplitude, such as the detector stage found in radio or television sets, or preamplifier stages that normally precedes the audio stage in tape or phonograph systems. The output signals of the audio signal source 20 are applied across a potentiometer 22, which serves as a volume control for the amplifier.

The signals to be amplified are coupled through a capacitor 26 to the base electrode of a driver transistor 28. The driver transistor 28 is connected as a common emitter single-ended Class A amplifier having its emitter electrode connected to ground and its collector electrode connected to a power supply terminal 30 through a resistor 32. The base electrode of an output transistor 34 is directly coupled to the collector electrode of the driver transistor 28. The direct connection establishes the bias voltage for the output transistor 34 and also applies the audio frequency signals to be amplified to the output stage. The output transistor 34, in the present embodiment, is connected as a Class A power amplifier having its collector electrode connected through a primary winding 36 of a transformer 38 to a power supply terminal 40, while its emitter electrode is connected to ground through the series resistors 42 and 44 and a bypass capacitor 46 connected in parallel with resistor 44. A capacitor 35 is connected across the primary winding 36 for frequency compensation and to reduce the effect of transient voltages developed by the transformer 38.

The voltage developed across the resistor 44 is applied to the base electrode of the driver transistor 28 through a feed-back resistor 48. A resistor 50 coupled between the base electrode of the driver transistor 28 and ground and a resistor 52 also coupled between the base of the driver transistor 28 and ground through the resilient contact 16 and the switch contactor 18 (in the switch position as shown in the drawing) cooperate with the resistor 48 to provide the biasing voltage for the Class A operation of the transistors 28 and 34.

A terminal 54 of the secondary winding 56 of the transformer 38 is connected to one lead of the voice coil 11 of the loudspeaker 10 and also to the collar contact 14 of the earphone jack 12. The other lead of the voice coil 11 is connected to ground. A second terminal 58 of the secondary winding 56 is connected to the resilient contact 16 of the earphone jack 12. In the switch position as shown in the drawing, the resilient contact 16 makes electrical contact with the switch contactor 18 completing the circuit connection between the secondary winding 56 and loudspeaker 10 rendering the amplifier operative to drive the loudspeaker 10.

As previously mentioned, when the plug 2 is inserted in the earphone jack 12, the resilient contact 16 moves away from the switch contactor 18 breaking the electrical connection therebetween. At the same time, the voltage developed across the secondary winding 56 of transformer 38 is applied through the collar contact 14 and the resilient contact 16 to the contacts 4 and 6 of the plug 2 drive the auxiliary device connected thereto. With the electrical circuit between the swich contactor 18 and the resilient contact 16 broken, the biasing resistor 52 now serves as a feedback resistor between the output circuit of the power amplifier and the input circuit of the driver amplifier. The polarity of a secondary winding is so selected that the feed-back voltage applied through resistor 52 to the base of the driver transistor 28 is degenerative so that the gain of the amplifier is reduced whenever the electrical contact between the resilient contact 16 and switch contactor 18 (ground) is opened. The feed-back path between the secondary winding 56 and the base electrode of transistor 28 is completed through the resistors 50 and 52, and the voice coil 11 of the loudspeaker 10.

With a limited range of input signals being applied across the potentiometer 22, the size of the resistor 52 is selected relative to the resistor 50 so that the output power developed across the earphones 1 will be limited to within the power dissipation capabilities of the device and that the potentiometer 22 can act as a compatible volume control means for both the output speaker 10 and the earphone 1. The values of the resistors 50 and 52 are high compared to the impedance of the voice coil 11 of the loudspeaker 10 so that essentially very little output appears across the voice coil 11, rendering the loudspeaker essentially inactive while the amplifier is driving the auxiliary load.

With commercially available high voltage transistors such as an RCA 40264 transistor (having a reverse collector breakdown voltage in the order of 300 v.) employed as the output transistor 34, and applying a power supply voltage in the order of 90 volts to terminal 40, the single-ended amplifier shown can safely produce one-half watt of low distortion output power. This is sufficient power for driving most small radio and television speakers.

In order to efficiently produce this required amount of power, the output stage is designed so that the transistor 34 drives the load impedance of the loudspeaker 10 (reflected through the transformer 38) in a manner that the transistor 34 operates continually within its power rating. Furthermore, the reflected loading effect of the loudspeaker 10 is of sufficient magnitude to dampen any transients due to rapid fluxuation in input signals (as, for example, experienced by tuning to a strong signal before AGC action can take control) to safe operating values. If an auxiliary output load having a much higher impedance than that of the loudspeaker 10 (such as that exhibited by high impedance earphones or by a series circuit including a series dropping resistor and a set of earphones) is directly substituted for the speaker 10, without compensating for the difference in impedances by decreasing the gain of the circuit, the correspondingly higher impedance reflected through transformer 38 is insufficient to dampen the transients to a safe level. With the high reflected impedance, voltage transients in the order of 500 to 600 volts would be experienced at the collector electrode of the transistor 34 thereby exceeding the reverse collector breakdown rating. With the NPN transistor shown in the drawing, a reverse collector voltage is positive relative to ground.

With the amplifying system of the invention, an auxiliary load can be switched into the amplifier circuit, simultaneously rendering the loudspeaker inoperative, and also converting the amplifier output circuit for low power operation, making the system compatible for both low and high power dissipation devices. Since the maximum amplitude of signal that can be applied to the amplifier circuit is limited (as in the case of the audio signal generating stages 20), by operating the amplifier circuit at a reduced gain, the output power available from the amplifier circuit for the same range of input signals as previously applied is correspondingly reduced. The magnitude of the input transient signals applied to the transistor 34 is also correspondingly reduced.

It should be noted, by providing a safe means for driving the low power dissipating output device from the power amplifier output circuit, there is no need to resort to switching the auxiliary device into lower power stages, i.e. switching into the driver stage as done in the prior art. This provides the additional advantage of allowing the output stage to be directly driven by a driver stage rather than requiring a capacitor or transformer coupling. Any switching in the bias circuit of the output stage of a transformer power output stage, introduces momentary open circuits which in the case of high voltage output stages may result in a transient voltage of sufficient magnitude to destroy the output transistor.

What is claimed is:

1. An audio amplifying system comprising:

an amplifier having an input circuit and an output circuit;

an earphone jack, said earphone jack including a switch adapted to be actuated when an earphone plug is inserted in said jack;

a loudspeaker;

circuit means for coupling said loudspeaker to said amplifier output circuit, said circuit means including said earphone jack switch for completing the circuit for driving said loudspeaker;

circuit means for coupling said earphone jack to said amplifier output circuit for adapting said amplifier circuit to drive a set of earphones plugged in said earphone jack;

impedance means coupled to said amplifier input circuit; and circuit means for coupling said impedance means to said amplifier output circuit to provide a degenerate feedback circuit operable to reduce the gain of said amplifier circuit when said earphone jack switch is actuated.

2. An audio amplifying system comprising:

an amplifier including an input terminal and a pair of output terminals;

an earphone jack, said earphone jack including a switch adapted to be actuated when an earphone plug is inserted in said jack, said switch having first and second normally closed contacts, said first contact connected to one of said amplifier output terminals and said second contact connected to a point of reference potential for said amplifier;

a loudspeaker having a first terminal connected to the other of said amplifier output terminals and a second terminal connected to said second contact, whereby the circuit for driving said loudspeaker includes said earphone jack switch;

a resistor connected between said first contact and said amplifier input terminal; and means for opening said first and second contacts when an earphone is inserted in said earphone jack, to provide a degenerative feedback circuit including said resistor from said one output terminal to said input terminal operable to reduce the gain of said amplifier.

3. An electrical circuit comprising:

an amplifier having first and second input terminals and first and second output terminals, said first input terminal being connected to a point of reference potential;

a load coupled between said first amplifier output terminal and said point of reference potential;

auxiliary output circuit means having first, second and third terminals, said second terminal being connected to said point of reference potential;

said auxiliary output circuit means including a switch providing a connection between said first and second terminals;

circuit means coupling said second output terminal of said amplifier to said first terminal of said auxiliary output circuit means, thereby completing a circuit for driving said load;

circuit means coupling said first output terminal of said amplifier to said third terminal of said auxiliary output circuit means for providing a circuit for driving an included auxiliary load when said load is coupled between said first and third terminals of said auxiliary output circuit means; and impedance means coupled between said second input terminal and said second output terminal of said amplifier operable to provide a degenerative circuit therebetween to reduce the gain of said amplifier when said auxiliary load is so included.

4. An audio amplifying system comprising:

a transistor having base, collector and emitter electrodes;

a transformer having a primary and a secondary winding;

circuit means for connecting one end of said primary winding to said collector electrode;

circuit means, including a source of energizing potential, connected between the other end of said primary winding and said emitter electrode to provide an amplifier circuit, said circuit means defining a direct current path between said collector and emitter electrodes;

means for connecting said collector-to-emitter current path to a point of reference potential;

input circuit means coupled to said base electrode for applying signals to be amplified and for biasing said transistor into conduction;

a loudspeaker coupled between one end of said secondary winding and said point of reference potential;

an earphone jack having a first and second contacts adapted to make separate electrical contacts with an earphone plug inserted in said jack;

said earphone jack including a switch connected between a terminal and said first contact, said switch being adapted to be opened when an earphone plug is inserted in said jack;

circuit means for coupling said second contact to said one end of said secondary winding;

circuit means for coupling said first contact to the other end of said secondary winding;

circuit means for coupling said terminal to said point of reference potential; and impedance means coupled between said other end of said secondary winding and said input circuit means to provide a degenerative feedback circuit to reduce the gain of said amplifier circuit when said earphone jack switch is opened.

5. An audio amplifying system comprising:

a transistor having base, collector and emitter electrodes;

a transformer having a primary and a secondary winding;

circuit means for connecting one end of said primary winding to said collector electrodes;

circuit means, including a source of energizing potential, connected between the other end of said primary winding and said emitter electrode to provide an amplifier circuit, said circuit means defining a direct current path between said collector and emitter electrodes;

means for connecting said collector-to-emitter current path to a point of reference potential;

input circuit means coupled to said base electrode for aplying signals to be amplified and for biasing said transistor into conduction;

a loudspeaker coupled between one end of said secondary winding and said point of reference potential;

an earphone jack having a first and second contacts adapted to make separate electrical contacts with an earphone plug inserted in said jack;

said earphone jack including a switch connected between a terminal and said first contact, said switch being adapted to be opened when an earphone plug is inserted in said jack;

circuit means for coupling said second contact to said one end of said secondary winding;

circuit means for coupling said first contact to the other end of said secondary winding;

circuit means for coupling said terminal to said point of reference potential;

impedance means having a value of impedance that is substantially greater than the impedance of said loudspeaker, and circuit means for coupling said impedance means between said other end of said secondary winding and said input circuit to provide a degenerative feedback circuit operative to reduce the gain of said amplifier circuit when said switch is opened, said circuit means including said loudspeaker as part of said feedback path wherein only a small portion of the signal developed across the secondary winding appears across the loudspeaker essentially inactivating the loudspeaker when said switch is opened.

6. An amplifying system comprising:

an amplifier circuit including an input circuit and an output circuit and having a predetermined gain and power output capacity for a given range of applied input signal amplitudes;

a load impedance having a power dissipating capacity greater than said power output capacity of said amplifier;

a switch;

circuit means for coupling said load impedance to said amplifier circuit output circuit through said switch for developing output signals across said load impedance;

an auxiliary output circuit coupled to said amplifier output circuit having a plurality of terminals adapted to be connected to an auxiliary load impedance, said auxiliary load impedance having a substantially lower power dissipation capacity than said power output capacity of said amplifier circuit;

degenerative feedback circuit means coupled between said amplifier input and output circuits for reducing the gain of said amplifier circuit when said switch is actuated, thereby reducing the available power output from said amplifier circuit for said range of input signal amplitudes to within the power dissipation capacity of said auxiliary load impedance.

7. An amplifying system comprising:

an amplifier circuit including an input and an output circuit and having a predetermined gain and power output capacity for a given range of applied input signal amplitude;

a load impedance having a power dissipating capacity greater than said power output capacity of said amplifier;

a switch;

circuit means for coupling said load impedance to said amplifier circuit output circuit through said switch for developing output signals across said load impedance;

an auxiliary output circuit coupled to said amplifier output circuit having a plurality of terminals adapted to be connected to an auxiliary load impedance when said switch is actuated, said auxiliary load impedance having a substantially lower power dissipation capacity than said power output capacity of said amplifier circuit;

degenerative feedback circuit means coupled between said amplifier input and output circuits operative to reduce the gain of said amplifier circuit when said switch is actuated, thereby reducing the available power output from said amplifier circuit for said range of input signal amplitudes to within the power dissipation capacity of said auxiliary load impedance, said degenerative feedback circuit including said load impedance and an impedance element having an impedance value substantially greater than the impedance of said load impedance wherein only a negligible portion of the output signal developed at said amplifier circuit output circuit appears across said load impedance when said switch is actuated.

8. An auxiliary output circuit for an audio amplifier circuit having a predetermined gain and including an input circuit capable of producing a limited range of input signal amplitudes to drive said audio amplifier circuit and an output circuit coupled to drive a loudspeaker comprising:

switching means connected in series with said amplifier output circuit and said loudspeaker;

a plurality of terminals adapted to be connected to an auxiliary load impedance that has a substantially lower power dissipation capacity than said loudspeaker;

circuit means coupling said plurality of terminals to the output circuit of said amplifier;

impedance means exhibiting a substantially high impedance as compared to the impedance of said loudspeaker, and circuit means for coupling said impedance means to said amplifier whereby said impedance means and said loudspeaker form a degenerative feedback path that is operative to reduce the gain of said amplifier when said switching means is actuated, wherein the power output of said amplifier for said limited range of input signals is substantially reduced and wherein the amount of output signals applied to said loudspeaker is negligible when compared to the amount of signals required to drive said loudspeaker essentially rendering the loudspeaker inoperative when said switch is actuated.

References Cited

UNITED STATES PATENTS

| | | |
|---|---|---|
| 2,768,234 | 10/1956 | Popp. |
| 2,885,483 | 5/1959 | Faulkner. |
| 3,172,955 | 3/1965 | Robien. |

KATHLEEN H. CLAFFY, *Primary Examiner.*

R. TAYLOR, *Assistant Examiner.*